Oct. 6, 1931.  W. V. HOEFEN  1,826,351
CONVEYER CHAIN
Filed March 22, 1930
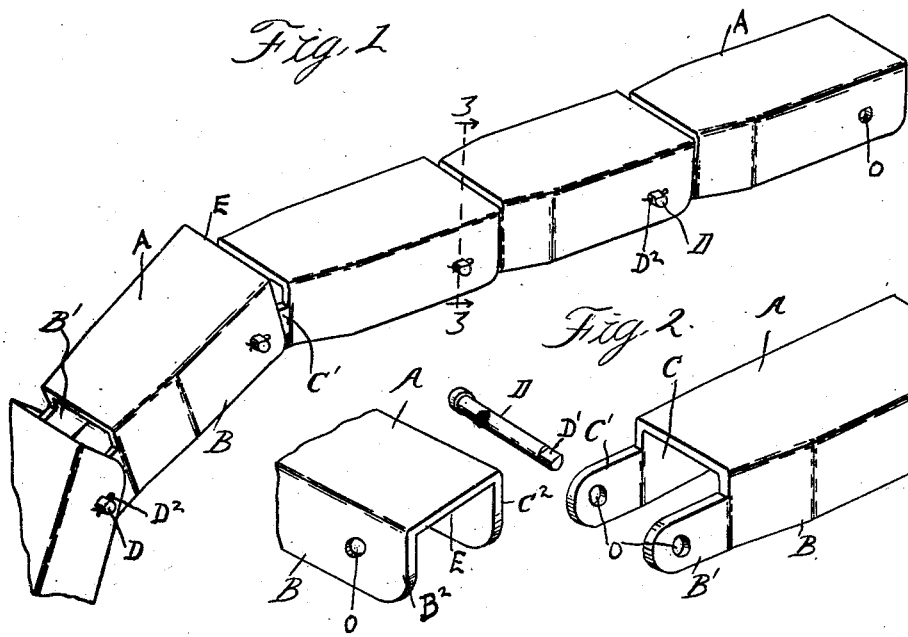
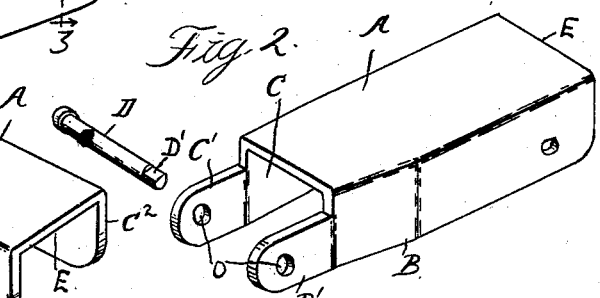
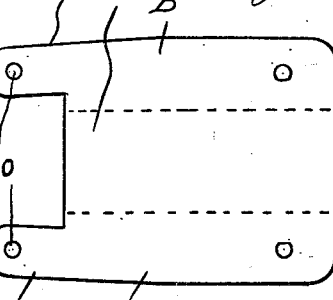
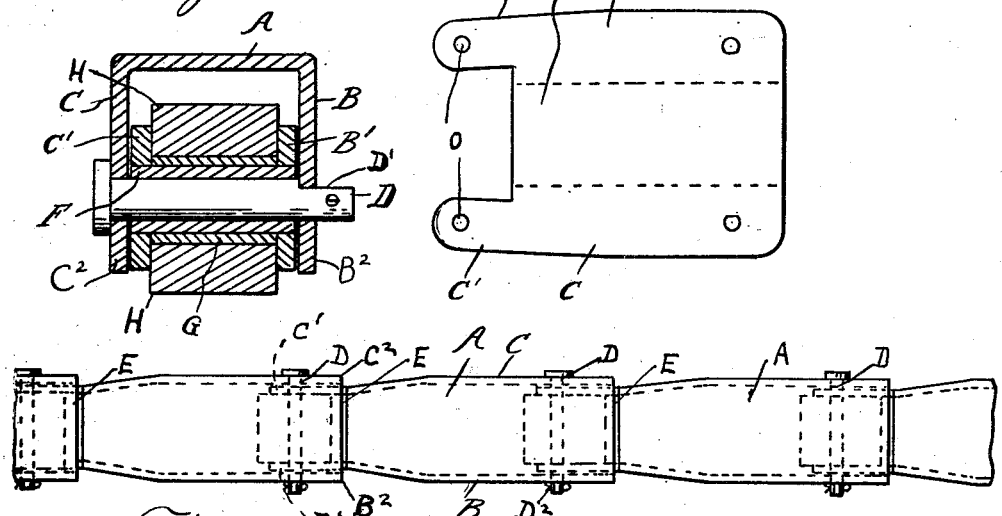
INVENTOR
Walter V. Hoefen
BY
ATTORNEYS Patented Oct. 6, 1931

1,826,351

UNITED STATES PATENT OFFICE

WALTER V. HOEFEN, OF DETROIT, MICHIGAN, ASSIGNOR TO BROWN-HUTCHINSON IRON WORKS, OF DETROIT, MICHIGAN, A CORPORATION OF MICHIGAN

CONVEYER CHAIN

Application filed March 22, 1930. Serial No. 438,132.

This invention relates to an improvement in the construction of chains of the type particularly directed to endless chain conveyer mechanism, and has for its object an improved organization of parts which per unit of length are of far less weight than similar constructions now employed, and which consequently will require the expenditure of less power to adequately drive it, and which at the same time is particularly adapted for use in the conveyance of articles, such for example as tire molds, from which in the intermediate stages of manufacture of the tires there is likely to be a dripping or exudation of surplus material, which if permitted to fall upon the connecting pivot pins or similar bearing parts of the chain, is more than apt to result in a clogging and impairment of efficiency thereof, which, if not remedied at frequent intervals, and which would of course involve the stoppage of the mechanism meantime and a resultant time loss as to factory production, would soon effect its rapid deterioration to the point of worthlessness.

The central idea of my improved construction resides in the contouring of each link of the chain and the positioning of the connecting pivot studs accordingly, so that the breaks or spaces necessarily occurring between the ends of the roofs or platforms of successive links are at no time during the operative phase of the endless belt mechanism as a whole, that is, when the links in question constitute the upper or article-carrying course of the endless chain mechanism as a whole, in anything but diverse vertical alignment relatively to the positioning of the adjacent correlating pivot studs. The construction herein offered also affords such a substantial platform as regards breadth that if two such endless chain units be spacedly mounted in parallel relation about sprocket wheels carried on common shafts at either end of the unit, and if the plane of the top surface of the several constituent links be slightly above that of a fixed and immobile flooring or platform located between them, an article rested near its opposite edges upon these two conveyer units can be carried forward to its destination with equal efficiency as though each chain unit contained a cross over or correlating platform between the two endless chain elements; and of course the reduced weight resulting from the omission of such platform or bridge elements involves a correspondingly lesser degree of actuative power.

In the drawings:

Figure 1 is a perspective of several serially connected carrier chain links of my improved type, showing their relation to one another both when in straight-away alignment and when starting to turn over a supporting sprocket wheel or similar element.

Figure 2 is a perspective view of fragmentary adjacent ends of two link elements separated from one another, and with their correlating pin or stud withdrawn.

Figure 3 is a cross-sectional view on a somewhat larger scale, taken along the line 3—3 of Figure 1 and looking in the direction of the arrows there shown, designed to bring out as well the possibility of including in the structure one or more sleeves as bushings about each correlating pintle.

Figure 4 is a plan view of a single link which is preferably formed in quantity from sheet metal, showing its spread-out contour before being bent to the shape in which it is designed to function.

Figure 5 is a plan view of a plurality of links thus correlated with their interfitting and overengaged parts shown in dotted lines.

The blank A shown in Figure 5 represents in spread out form, as stated, the initial form of one of the links of my improved carrier chain. In addition to its central body portion, it comprises a pair of integral side wings or skirtings, as B and C, which are bent over into substantially right angular relation with the intermediate web portion and which it will be noted have forwardly projecting ear portions B' and C' respectively, each provided with a hole as O through which a correlating bolt D can be passed.

Thanks to the slightly tapered contour of the blank as shown in plane or spread-out form in Figure 5, the opposite end of the constituent blank from that constituted by the ears B' and C' is sufficiently broader to permit the fit between the ends B² and C² of the ears B' and C' of the next adjacent link, and these portions are similarly provided with registering apertures, through which a similar correlating bolt can pass, the latter after insertion being headed down at its ends or provided with a cotter pin as D² so as to resist undesired escape from its correlating position. The corners of the ears B' and C' and of the recessed or inbent portions B² and C² are adequately curved or rounded, so that whether the chain formed by the plurality of such link units extends in a straight line or is bent or curved as shown at the left of Figure 1, these parts will coactingly interfit.

It will be noted that the opposite end of the central roof or platform formed by the web A from that beyond which the ears B' and C' project extends as at E to a point closely adjacent the forward or ear-flanked end of the next adjacent link. Thus, if any fluid such as partly melted rubber escapes or is spilled from a container, such as a tire mold, which is rested upon the endless chain carrier units for conveyance to a distant point, it cannot possibly make its way to a clogging position with reference to the correlating pivot stud and the holes in the webs through which it passes.

At the same time it is obvious that since the central web or roof portion of each link may be made of any desired width, the endless carrier mechanism thus formed can be made to do without any special flooring piece. And it is also to be observed that the parts of each individual link cooperatively with the correlating pivot stud furnish all the necessary uniting means between the several constituent chain elements, thus obviating the necessity of any separate or additional connecting links or bridging pieces between the adjacent ends of the several links themselves.

As brought out particularly in large-scale cross sectional Figure 3, the pintle or correlating bolt D is preferably slightly flattened at one end, D', so that it will not move rotatively relatively to the apertured ears B' and C'. About the pintle is positioned a steel sleeve or bushing F which is similarly fixed at its ends relatively to the inbent web ends B² and C², and in turn about the steel bushing is preferably located a second bushing G about which is positioned an encircling bronze or similar oilless bushing element H which is designed to contact and take both the draw and the resultant wear due to the engagement against it of the teeth of an actuating sprocket gear over which the chain passes.

What I claim is:

1. A carrier chain, composed of a plurality of links of cross-sectionally channel bar contour, each link being inbent at one end as to each of its lateral web portions and having its bridging top portion cut away therebetween, thereby permitting the projection therebeyond of the ends of the lateral web portions for engagement in the broader end portion of the next adjacent link and protectedly under the web portion thereof, and pintle stems passing through registeringly apertured portions of the meeting end portions of the lateral webs of adjacent links at relatively remote points from the exposed lines of meeting of the webs of the links, whereby said links are operatively correlated and whereby there are provided suitably spaced transversely-extending parts with which the teeth of an actuating sprocket wheel may operatively engage.

2. A carrier chain, composed of a plurality of pin-correlated units of complementary and serially interfitting contour, each link having a central roofing web portion and integral lateral webs depending from either side of said central web, and the terminal portions of each lateral web being registeringly apertured for the engagement of a correlating pin therethrough, each pair of pintle-engaged lateral web ends and their coupling pin being positioned vertically subjacent a protecting portion of the overengaging central web portion adequately spaced from the end thereof.

3. A chain, comprising links of general channel bar cross-sectional contour, each link having the ends of its lateral web portions registeringly apertured for the engagement of a correlating pintle therethrough and through the lateral web portions of adjacent links at points relatively remote from the end thereof, and the intermediate web portions of each link being so contoured and positioned relatively to such points of juncture between adjacent links that the bearing constituted by the pintle is protectively overengaged by the overengaging intermediate portion against the access of objectionable matter deposited on said intermediate web portion.

4. A chain each link of which comprises integral central and laterally depending web portions, each end of each lateral web portion being apertured for the engagement of a correlating pintle through each of its companion end portions and through the complementarily contoured lateral web portions of the next adjacent link at points protectedly remote from the end thereof, and the central web portion of each link protectively overengaging the pintle-united portions of the links, thereby preventing the descent thereonto of objectionable material falling upon the exposed top surface of said central web portion.

5. A chain, comprising a serially connected group of link members, each of generally U shaped cross-sectional contour, the lateral webs of each being perforated near their ends for the engagement of a correlating pintle therethrough and through corresponding registering apertures in the lateral web portions of the adjoining units of the series at points in the latter protectedly removed from the end thereof, the intermediate web portion of each link being cut away to a degree adequate to position the pintle-united web ends of the component links subjacently of the intermediate web portion of the next adjacent link of the series.

6. In a conveyor chain, in combination with a plurality of serially correlated link members of generally uniform contour, pintle members operatively connecting the mutually registering portions of adjacent links, which portions are so positioned relatively to the intermediate web portions of the links that the latter protectively overengage the pintle-correlated portions of the respective links against access thereto of impurities from above, and bushing elements engaging about the pintle members for protectively spacing them from direct engagement by the teeth of an actuative element over which the chain is adapted to pass.

7. In a relatively flexible power-transmitting member comprising a plurality of links each of cross-sectionally channel form, bearing members for correlating said links, and means for protecting the effective portions of the bearing members against access by foreign matter from above, comprising an overhanging portion which is an integral part of the web of each link, and a projecting portion carried by each link to fit beneath the overhanging portion of the link next adjacent, each of said bearing members being arranged beneath the overhanging portion of one link and being engaged by the projecting portion of the next link.

8. In a chain comprising a plurality of links, coupling pins for correlating said links in relatively movable relation to each other, and means for protecting said coupling pins from access by foreign matter, comprising an overhanging portion of channel form in each link, the coupling pins traversing registering apertures in the walls of the several links protected on three sides thereby.

9. In a link belt, coupling pins for correlating the links in vertically flexible relation to one another, and means for protecting the effective portions of the coupling pins against access by foreign matter, comprising an overhanging portion having depending sides carried by each link, and a projecting portion carried by each link to fit beneath the overhanging portion of the link next adjacent and between its depending sides, each of the coupling pins being arranged within the overhanging portion of one link and protected on three sides thereby, and engaged therewithin by the projecting portion of the next link.

10. In a chain comprising a plurality of links, bearing pintles for correlating the links in limitedly movable mutual relation, and means for protecting the effective portions of the bearing pintles against access by foreign matter, comprising a portion of channel form carried by each link, having a cross web and outstanding substantially parallel sides perpendicularly disposed relatively to the plane of said web, and projecting portions carried by each link to fit within the channel portion of the link next adjacent, the pintles traversing suitable apertures in the interfitting channel and projecting portions of the several links and being fitted non-rotatably within the channel portion of one link and rotatably within the projecting portions of the other.

11. A chain composed of links of cross-sectionally channeled form, each of said links having a terminal portion fitting within a terminal portion of the link next adjoining, pintles whereby the interfitting portions are secured together in limitedly movable relation, each of said pintles fitting non-rotatably and relatively tightly within suitable apertures in the outermost link portions and rotatably within suitable apertures in the inner link portions, whereby the tight engagement of the pintle with the outer link portions prevents foreign matter from gaining access along the pintle to the space between them.

In testimony whereof I sign this specification.

WALTER V. HOEFEN.